United States Patent
Liu

(10) Patent No.: US 9,904,361 B2
(45) Date of Patent: Feb. 27, 2018

(54) ELECTRONIC DEVICE AND FACIAL EXPRESSION OPERATION METHOD

(71) Applicant: Chiun Mai Communication Systems, Inc., New Taipei (TW)

(72) Inventor: Ting-Kai Liu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/197,792

(22) Filed: Jun. 30, 2016

(65) Prior Publication Data

US 2017/0024005 A1    Jan. 26, 2017

(30) Foreign Application Priority Data

Jul. 20, 2015  (CN) .......................... 2015 1 0427524

(51) Int. Cl.
*G06F 3/01* (2006.01)
*G06F 3/03* (2006.01)
*G06F 3/0484* (2013.01)
*G06T 7/73* (2017.01)
*G06K 9/00* (2006.01)

(52) U.S. Cl.
CPC ............ *G06F 3/012* (2013.01); *G06F 3/0304* (2013.01); *G06F 3/04845* (2013.01); *G06K 9/00281* (2013.01); *G06K 9/00315* (2013.01); *G06T 7/74* (2017.01); *G06T 2207/10004* (2013.01); *G06T 2207/30201* (2013.01)

(58) Field of Classification Search
CPC .................................. G06F 3/012; G06T 7/74
USPC ......................................................... 345/156
See application file for complete search history.

(56) References Cited

U.S. PATENT DOCUMENTS

| | | | |
|---|---|---|---|
| 9,055,071 B1 * | 6/2015 | Gates | H04L 63/1408 |
| 9,652,915 B2 * | 5/2017 | Howe | G07C 9/00158 |
| 2014/0347272 A1 * | 11/2014 | Hernandez-Abrego | G10L 17/04 345/156 |

* cited by examiner

Primary Examiner — Fred Tzeng
(74) Attorney, Agent, or Firm — ScienBiziP, P.C.

(57) ABSTRACT

A facial expression operation method includes capturing images using a camera device of an electronic device. A face area of the user exists in the images is determined by comparing the images with face image samples stored in a storage device. Feature values of the face area are calculated when the face area exists in the images. A facial expression is determined by comparing the feature values of the face area and the feature values of the face image samples. The electronic device is operated automatically to perform a corresponding function according to the facial expression.

17 Claims, 11 Drawing Sheets

ELECTRONIC DEVICE AND FACIAL EXPRESSION OPERATION METHOD

CROSS-REFERENCE TO RELATED APPLICATIONS

This application claims priority to Chinese Patent Application No. 201510427524.3 filed on Jul. 20, 2015, the contents of which are incorporated by reference herein.

FIELD

The subject matter herein generally relates to operation technology, and particularly to an electronic device and a method for operating the electronic device by a facial expression.

BACKGROUND

An electronic device such as a mobile phone configured with a touch panel can be operated by touch. However, when a user operates the electronic device, the user needs to click or slide on the touch panel. It is dull to operate the electronic device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
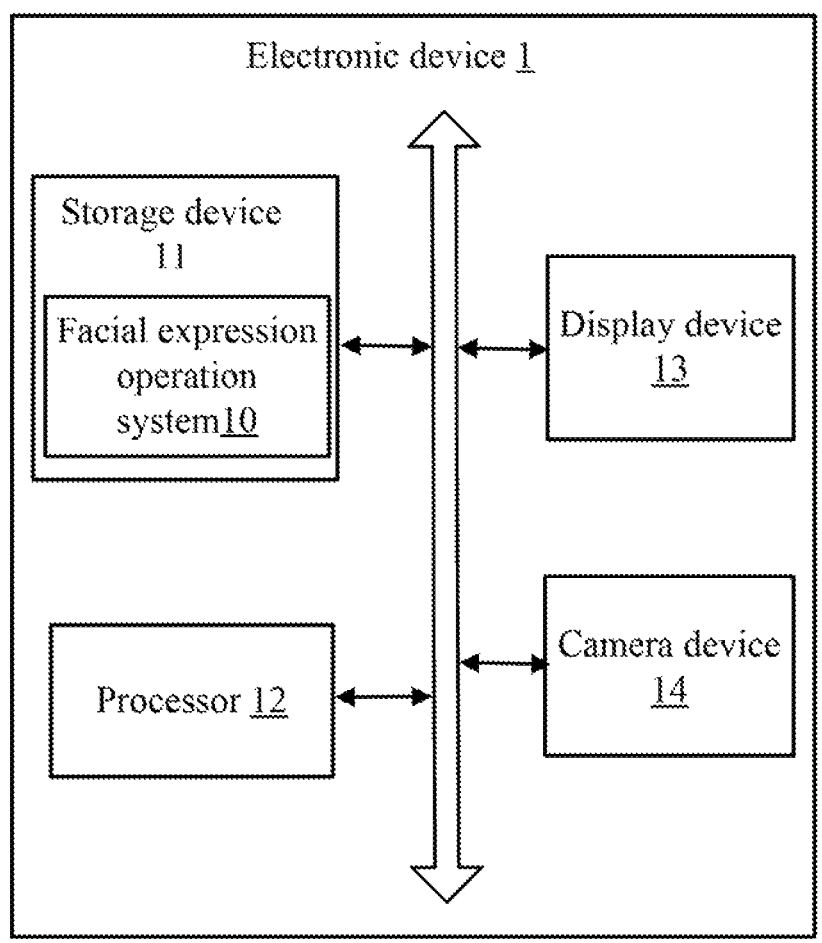
FIG. 1 is a block diagram of one embodiment of an electronic device including a facial expression operation system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of an electronic device. Depending on the embodiment, the electronic device 1 can include, but is not limited to, a facial expression operation system 10, a storage device 11, at least one processor 12, a display device 13, and a camera device 14. The above components communicate with each other through a system bus. In at least one embodiment, the electronic device 1 can be a mobile phone, a tablet computer, a personal digital assistant, or any other suitable device configured with a function of capturing images. FIG. 1 illustrates only one example of the electronic device 1 that can include more or fewer components than illustrated, or have a different configuration of the various components in other embodiments.

In at least one embodiment, the storage device 11 can be a memory of the electronic device 1. In other embodiments, the storage device 11 can be a secure digital card, or other external storage device such as a smart media card.

The at least one processor 12 can be a central processing unit (CPU), a microprocessor, or other data processor chip that performs functions of the electronic device 1.

In at least one embodiment, the display device 13 can display a user interface of the electronic device 1 and/or images captured by the camera device 14. The display device 13 can be a liquid crystal display (LCD) or an organic light-emitting diode (OLED) display screen. The camera device 14 can capture images of a user in front of the camera device 14. The camera device 14 can be a front camera device, or a rear camera device.

In at least one embodiment, the storage device 11 can store program codes of the facial expression operation system 10 and a database. In at least one embodiment, the database can include a data table that records a relationship between a facial expression and operations of the electronic device 1. In at least one embodiment, the facial expression is detected by the facial expression operation system 10, and a corresponding function of the electronic device 1 can be performed according to the facial expression. The corresponding function of the electronic device 1 include, but are not limited to, displaying an image next to a currently displayed image, displaying a last image of the currently displayed image, deleting the currently displayed image, deleting a collection of images, moving the currently displayed image to a predetermined collection of images, and other.

Figure 4:
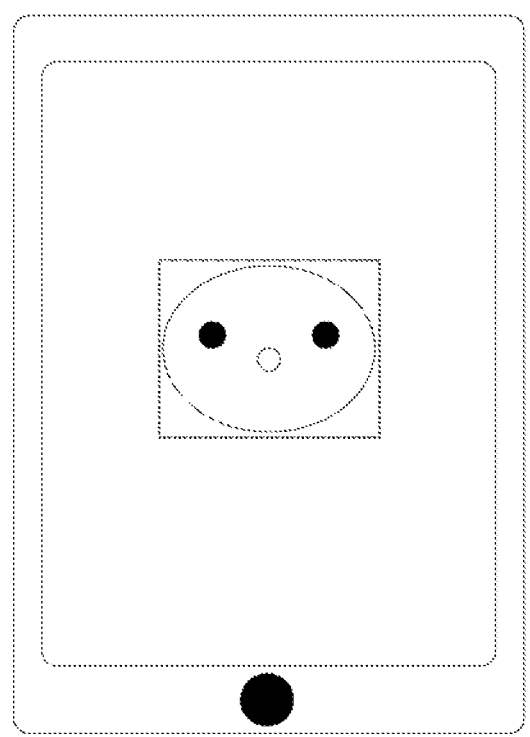
FIG. 4 illustrates an example of a display window of the electronic device of FIG. 1.

In at least one embodiment, the facial expression operation system 10 can record face image samples through the camera device 14 when the electronic device 1 is running the facial expression operation system 10 for the first time. For example, when the camera device 14 is capturing a face image and the display device 13 is displaying the face image in a display window as delineated by the dotted box shown in FIG. 4, the facial expression operation system 10 can generate a face image sample such as the face image displayed in the display window in FIG. 4, and store the face image sample into the storage device 11. The area of the display window can be equal to the area of the display device 13, or be a part of the area of the display device 13. For example, the area of the display window can be half of the area of the display device 13.

In at least one embodiment, the facial expression operation system 10 can execute an operation to record several face image samples of a user, and can generate several similar face image samples. In order to reduce the difference between the face image sample and the real face image of the user, the facial expression operation system 10 can create as the best face image sample which is most similar to the real face image according to the several similar face image samples. Furthermore, the facial expression operation system 10 can generate face image samples of other users.

Figure 5:
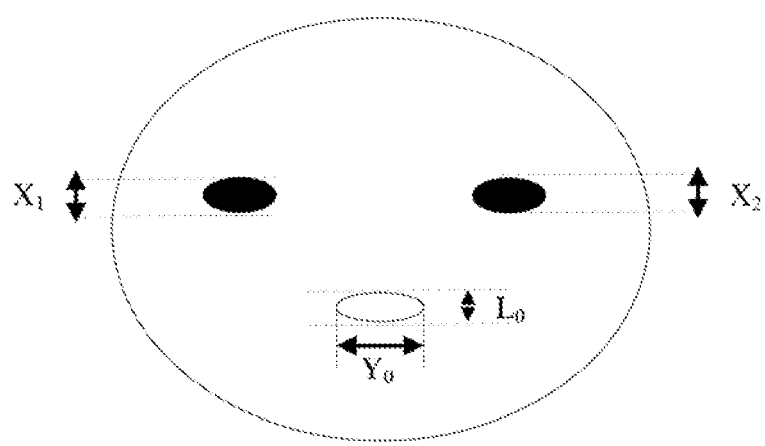
FIG. 5 illustrates an example of a face image sample in the system of FIG. 1.

In at least one embodiment, the facial expression operation system 10 can recognize the face image samples by using a face recognition technique, and acquire the feature values of the face image samples. The feature values include a vertical maximum height of a right eye of the user (e.g., "$X_1$" as shown in FIG. 5), a maximum vertical height of a left eye of the user (e.g., "$X_2$" as shown in FIG. 5), a maximum horizontal width of a mouth of the user (e.g., "$Y_0$" as shown in FIG. 5), and a maximum vertical height of the mouth of the user (e.g., "$L_0$" as shown in FIG. 5).

In at least one embodiment, the facial expression operation system 10 can recognize the images stored in the storage device 11 by using the face recognition technique, and can store the images which match the face image samples into one or more collections of images of the user. The collections include a first category in which the capturing target of the images is a person, a second category in which the capturing target of the images is a group of people.

Figure 2:
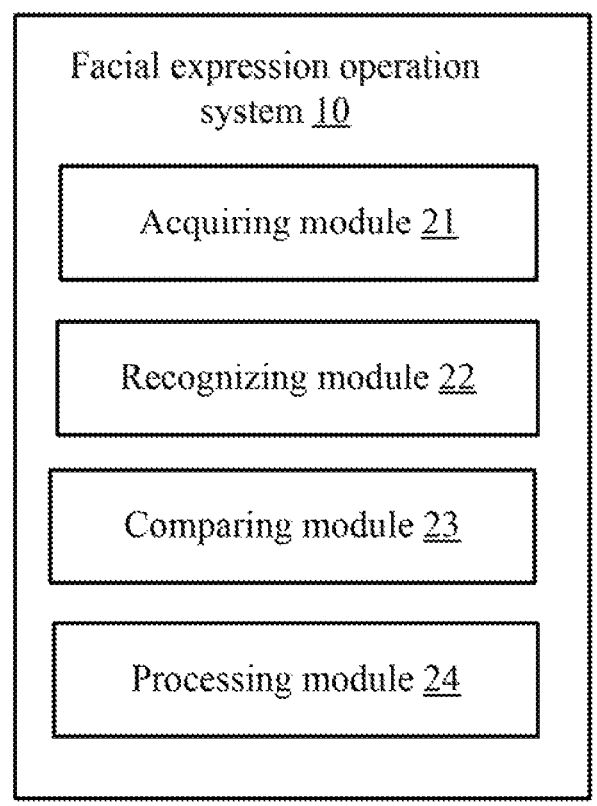
FIG. 2 is a block diagram of one embodiment of modules of the facial expression operation system.

FIG. 2 illustrates a block diagram of one embodiment of modules of the facial expression operation system 10. In at least one embodiment, the facial expression operation system 10 can include an acquiring module 21, a recognizing module 22, a comparing module 23, and a processing module 24. The modules 21-24 include computerized codes in the form of one or more programs that may be stored in the storage device 11. The computerized codes include instructions that are executed by the at least one processor 12.

Figure 3:
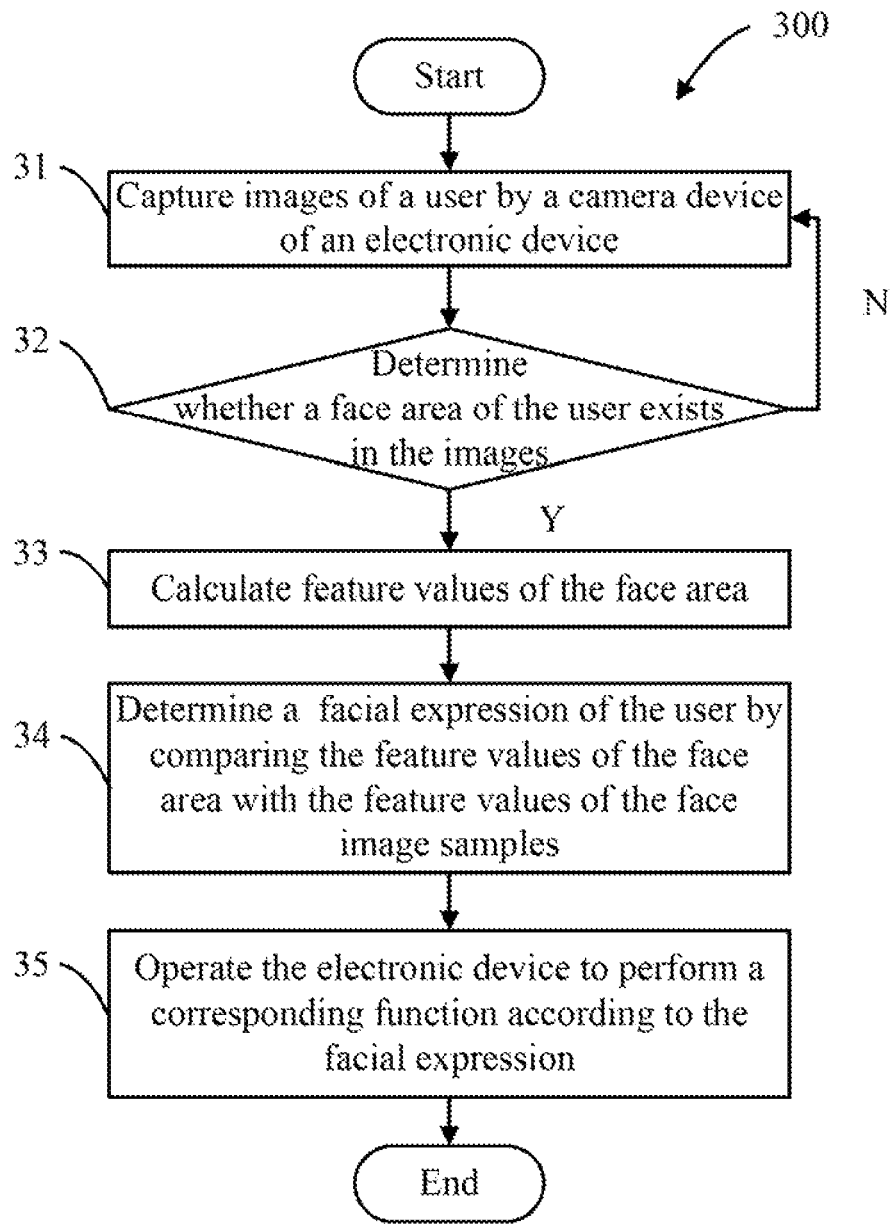
FIG. 3 illustrates a flowchart of one embodiment of a method of operating the electronic device base on facial expression.

FIG. 3 illustrates a flowchart which is presented in accordance with an example embodiment. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the embodiment, additional steps can be added, others removed, and the ordering of the steps can be changed.

At block 31, when the camera device 14 is activated, the acquiring module 21 can capture images of a user by the camera device 14. The acquiring module 21 further can pre-record face image samples of the user, and store the face image samples into the storage device 11.

At block 32, the recognizing module 22 can determine whether a face area of the user exists in the images by the conventional face recognition technique. When the face area of the user exists in the images, the process goes to block 33. When the face area of the user is not in the images, the process goes back to block 31.

In at least one embodiment, the recognizing module 22 can detect the face area of the images by comparing the face area of the images with the face image samples. When similarity between the face area of the image and the face image sample is equal to a predetermined value (e.g., 90%), the recognizing module 22 can determine the face area of a user exists in the images.

At block 33, the recognizing module 22 can calculate feature values of the face area. In at least one embodiment, the feature values include the feature values of the eyes of the face area, and the feature values of the mouth of the face area. For example, "$X_3$", "$X_4$", "$L_1$", and "$Y_1$" as shown in FIG. 6 are such feature values.

At block 34, the comparing module 23 can determine a facial expression of the user by comparing the feature values of the face area and the feature values of the face image samples.

In at least one embodiment, the comparing module 23 can compare the feature values of the face area and the feature values of the face image samples by using formulas (1)~(5) as hereinafter described, and can determine whether the facial expression of the user is changed by comparing results of the formulas (1)~(5) with at least one predetermined value. In detail, the comparing module 23 can determine the differences between the face area and the face image samples by dividing the feature values of the face area by the feature values of the face image samples. The comparing module 23 can also subtract the feature values of the face area from the feature values of the face image samples. The comparing module 23 further can calculate a first weighted average of the feature values of the face area and a second weighted average of the feature values of the face image samples. The comparing module 23 can determine the differences between the face area and the face image samples by dividing the first weighted average by the second weighted average or by subtracting between the first weighted average and the second weighted average.

Figure 6:
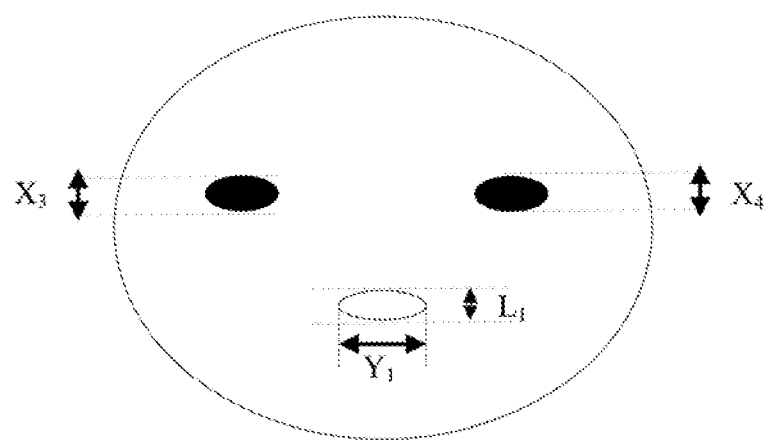
FIG. 6 illustrates an example of a face area of an image in the system of FIG. 1.

For example, a face image sample is shown in FIG. 5 and a face area of the user is shown in FIG. 6. The comparing module 23 can calculate the first weighted average of the feature values of the face area by applying formula $$Z_0 = X_1 * 30\% + X_2 * 30\% + Y_0 * 40\% \quad \text{(formula (1))}$$

and can calculate the second weighted average of the feature values of the face image samples by applying formula $$Z_1 = X_3 * 30\% + X_4 * 30\% + Y_1 * 40\% \quad \text{(formula (2))}.$$

In formulas (1) and (2), 30% is a first weighted value, and 40% is a second weighted value. The comparing module 23 further can calculate a first ratio between the feature values of the face image samples by formula $$G_1 = X_3/X_1 \quad \text{(formula (3))},$$

the feature values of the face area by formula $$G_2 = X_4/X_2 \quad \text{(formula (4))},$$

and a second ratio between the first weighted average and the second weighted average by formula $$F = Z_1/Z_0 \quad \text{(formula (5))}.$$

Figure 7:
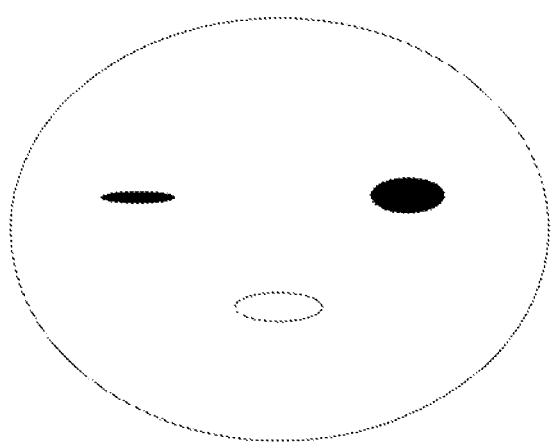
FIG. 7 illustrates an example of a right eye of a user winking in the system of FIG. 1.
Figure 8:
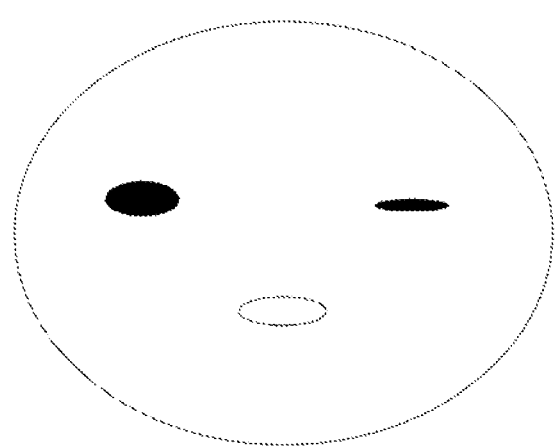
FIG. 8 illustrates an example of a left eye of a user winking in the system of FIG. 1.
Figure 9:
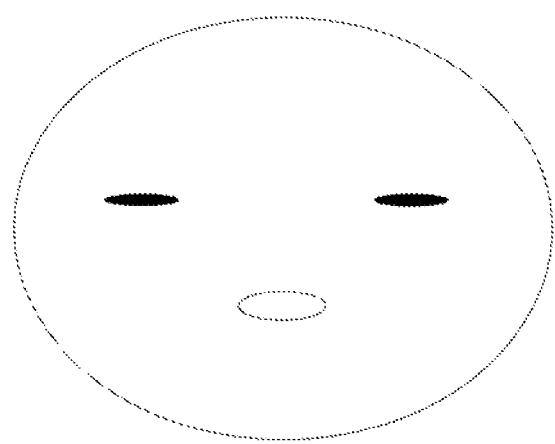
FIG. 9 illustrates an example of both eyes of the user winking in the system of FIG. 1.
Figure 10:
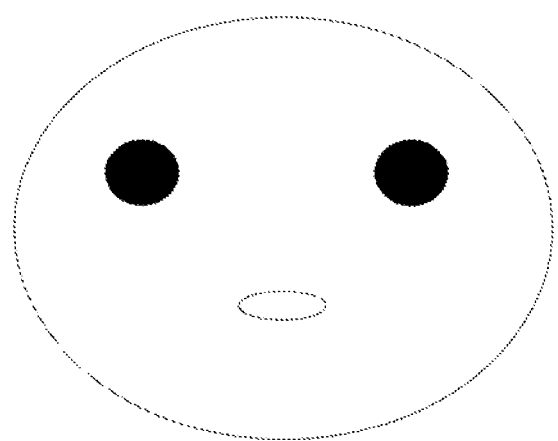
FIG. 10 illustrates an example of glaring eyes of the user in the system of FIG. 1.
Figure 11:
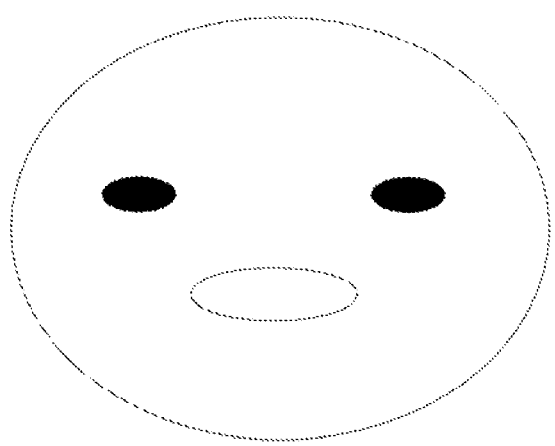
FIG. 11 illustrates an example of a changed mouth shape in the system of FIG. 1.

The comparing module 23 can determine the facial expression of the user according to $Z_0$, $Z_1$, $G_1$, $G_2$, and F. For example, when $0.9 \leq F \leq 1$, $0 < G_1 \leq 0.5$, and $0.5 < G_2 \leq 1$, the comparing module 23 can determine that the right eye of the user is winking, as shown in FIG. 7. When $0.9 \leq F \leq 1$, $0.5 < G_1 \leq 1$, and $0 < G_2 \leq 0.5$, the comparing module 23 can determine that the left eye of the user is winking, as shown in FIG. 8. When $0.9 \leq F \leq 1$, $0 < G_1 \leq 0.5$, and $0 < G_2 \leq 0.5$, the comparing module 23 can determine that both left and right eyes of the user are winking (user is blinking), as shown in FIG. 9. When $0.9 \leq F \leq 1$, $1 < G_1$, and $1 < G_2$, the comparing module 23 can determine that the left eye and the right eye are glaring, as shown in FIG. 10. When $1 < F$, $0.5 < G_1 \leq 1$, and $0.5 < G_2 \leq 1$, the comparing module 23 can determine that the mouth of the user is changed, as shown in FIG. 11.

In at least one embodiment, the formulas (1)~(5) can be adjusted, for example, the weighted values (30% and 40%) of the formulas (1) and (2) can be adjusted. The comparing module 23 can calculate the value of $Z_0$ by two of the parameters $X_1$, $X_2$, and $Y_0$, and can calculate the value of $Z_1$ by two of the parameters $X_3$, $X_4$, and $Y_1$. A division operation of formulas (3)~(5) can be changed to a subtraction operation. Furthermore, in other embodiments, the comparing module 23 can determine the facial expression of the user by the feature values of the mouth, or by the feature value of eyes.

At block 35, the processing module 24 can operate the electronic device 1 to perform a corresponding function according to the facial expression. In at least one embodiment, when the user is seeing images in the electronic device 1, the processing module 24 can control the electronic device 1 to operate the currently displayed image or the collection of the currently displayed image according to the facial expression of the user. For example, when the comparing module 23 determines that the right eye of the user is winking, the processing module 24 can control the display device 13 to display an image next to the currently displayed image. When the comparing module 23 determines that the left eye of the user is winking, the processing module 24 can control the display device 13 to display a last image of the currently displayed image. When the comparing module 23 determines that both eyes are winking, the processing module 24 can control the storage device 11 to delete the currently displayed image. When the comparing module 23 determines that both eyes are glaring, the processing module 24 can control the storage device 11 to delete the collection of the currently displayed image. When the comparing module 23 determines that the mouth of the user is changed, the processing module 24 can control the storage device 11 to move the currently displayed image in a predetermined collection.

As can be seen from block 31 to block 35, the present disclosure can automatic operate the electronic device 1 after detecting the facial expression of the user by establishing a corresponding relationship between the facial expression and operations of the electronic device 1. The present disclosure can see the images one by one according to the facial expression of the user, and can speed up a video when the user is watching the video, and can delete a file when the user is reading the file. It is convenient for the user to operate the electronic device 1.

In other embodiments, the acquiring module 21, the recognizing module 22, the comparing module 23, and the processing module 24 of the facial expression operation system 10 can be hardware or firmware.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A facial expression operation method applied in an electronic device, the electronic device comprising a camera device, and a storage device that stores a data table recording a plurality of face image samples of users and a plurality of feature values of the face image samples, the method comprising:

capturing images of a user by the camera device;

determining whether face area of the user exists in the images according to the face image samples;

calculating feature values of the face area when the face area exists in the images;

determining a facial expression of the user by comparing the feature values of the face area and the feature values of the face image samples;

operating the electronic device to perform a corresponding function according to the facial expression;

recognizing a plurality of images stored in the electronic device; and storing the images into one or more collections of images of the user when the images match with the face image samples of the user.

2. The method according to claim 1, further comprising:

comparing the feature values of the face area and the feature values of the face image samples by formulas; and determining the facial expression of the user by comparing results of the formulas with at least one predetermined value.

3. The method according to claim 2, wherein the formulas comprising:

calculating a first weighted average of the feature values of the face area of the user and calculating a second weighted average of the feature values of the face image samples of the user.

4. The method according to claim 3, wherein the formulas comprising:

dividing the first weighted average by the second weighted average or subtracting between the first weighted average and the second weighted average.

5. The method according to claim 2, wherein the formulas comprising:

dividing the feature values of the face area of the user by the feature values of the face image samples of the user or subtracting between the feature values of the face area of the user and the feature values of the face image samples of the user.

6. The method according to claim 1, wherein the feature values comprising:
a maximum vertical height of a left eye of the user, a maximum vertical height of a right eye of the user, a maximum horizontal width of a mouth of the user, and a maximum vertical height of the mouth of the user.

7. The method according to claim 1, wherein the corresponding function of the electronic device comprising:
displaying an image next to a currently displayed image, displaying a last image of the currently displayed image, deleting the currently displayed image, deleting a collection of images, moving the currently displayed image to a predetermined collection of images.

8. An electronic device comprising:
a camera device;
a storage device configured to store a data table recording a plurality of face image samples of users and a plurality of feature values of the face image samples; and
at least one processor;
wherein the storage device is further configured to store one or more programs that, when executed by the at least one processor, cause the at least one processor to:
capture images of a user by the camera device;
determine whether face area of the user exists in the images according to the face image samples;
calculate feature values of the face area when the face area exists in the images;
determine a facial expression of the user by comparing the feature values of the face area and the feature values of the face image samples;
operate the electronic device to perform a corresponding function according to the facial expression;
recognize a plurality of images stored in the electronic device; and
store the images into one or more collections of images of the user when the images match with the face image samples of the user.

9. The electronic device according to claim 8, wherein the at least one processor is further configured to:
compare the feature values of the face area and the feature values of the face image samples by formulas; and
determine the facial expression of the user by comparing results of the formulas with at least one predetermined values.

10. The electronic device according to claim 9, the formulas comprising:
calculating a first weighted average of the feature values of the face area of the user and calculating a second weighted average of the feature values of the face image samples of the user.

11. The electronic device according to claim 10, wherein the formulas comprising:
dividing the first weighted average by the second weighted average or subtracting between the first weighted average and the second weighted average.

12. The electronic device according to claim 9, wherein the formulas comprising:
dividing the feature values of the face area of the user by the feature values of the face image samples of the user or subtracting between the feature values of the face area of the user and the feature values of the face image samples of the user.

13. The electronic device according to claim 8, wherein the feature values comprising:
a maximum vertical height of a left eye of the user, a maximum vertical height of a right eye of the user, a maximum horizontal width of a mouth of the user, and a maximum vertical height of the mouth of the user.

14. The electronic device according to claim 8, wherein the corresponding function of the electronic device comprising:
displaying an image next to a currently displayed image, displaying a last image of the currently displayed image, deleting the currently displayed image, deleting a collection of images, moving the currently displayed image to a predetermined collection of images.

15. A non-transitory storage medium having stored thereon instructions that, when executed by a processor of an electronic device, causes the processor to perform a method for operating the electronic device by a facial expression, the electronic device comprising a camera device and a storage device that stores a data table recording a plurality of face image samples of users and a plurality of feature values of the face image samples, wherein the method comprises:
capturing images of a user by the camera device;
determining whether face area of the user exists in the images according to the face image samples;
calculating feature values of the face area when the face area exists in the images;
determining a facial expression of the user by comparing the feature values of the face area and the feature values of the face image samples;
operating the electronic device to perform a corresponding function according to the facial expression;
recognizing a plurality of images stored in the electronic device; and
storing the images into one or more collections of images of the user when the images match with the face image samples of the user.

16. The non-transitory storage medium according to claim 15, further comprising:
comparing the feature values of the face area and the feature values of the face image samples by formulas; and
determining the facial expression of the user by comparing results of the formulas with at least one predetermined values.

17. The non-transitory storage medium according to claim 15, wherein the feature values comprising:
a maximum vertical height of a left eye of the user, a maximum vertical height of a right eye of the user, a maximum horizontal width of a mouth of the user, and a maximum vertical height of the mouth of the user.

* * * * *